United States Patent [19]

Bridges

[11] 3,845,873
[45] Nov. 5, 1974

[54] VACUUM INSULATED CONTAINER
[75] Inventor: John A. Bridges, Nashville, Tenn.
[73] Assignee: Aladdin Industries, Incorporated, Chicago, Ill.
[22] Filed: Feb. 9, 1973
[21] Appl. No.: 331,026

[52] U.S. Cl. ............................. 215/13 R, 215/12 A
[51] Int. Cl. ............................................. A47j 41/02
[58] Field of Search ......... 215/13 R, 12 A; D9/119, D9/131, 97

[56] References Cited
UNITED STATES PATENTS

| | | | |
|---|---|---|---|
| 2,981,562 | 4/1961 | Long | 215/13 R |
| 2,981,984 | 5/1961 | Orr | 215/12 A X |
| 3,261,491 | 7/1966 | Bramming | 215/13 R |
| 3,341,045 | 9/1967 | Sandler | 215/13 R |
| 3,591,768 | 7/1971 | Torres | 215/13 X |
| 3,627,162 | 12/1971 | Dossin | 215/13 R |
| 3,722,538 | 3/1973 | Gezari | 215/13 X |
| D21,612 | 6/1892 | Underhill | D9/97 |
| D105,669 | 8/1937 | Mills | D9/119 |

*Primary Examiner*—Herbert F. Ross

[57] ABSTRACT

A vacuum insulated container has a double-walled filler with the space between the walls being evacuated so as to provide a vacuum insulating space. A jacket for the filler is provided by foaming in place a foamable plastic material of the type forming a relatively hard or impervious skin around the filler which adheres to the entire outer surface of the outer wall of the filler. A stopper and cup, the latter functioning as a cover, are also shown. The impervious skin could also be made by rotational or blow-molding a flexible vinyl skin and inserting the filler before foaming a flexible foam between the skin and the filler.

2 Claims, 3 Drawing Figures

VACUUM INSULATED CONTAINER

BACKGROUND OF THE INVENTION

This invention relates generally to insulated containers. More specifically, it relates to such containers formed using a double-walled filler wherein the space between the walls is substantially evacuated.

Most vacuum insulated containers of the so-called thermos bottle type are constituted by a double-walled glass filler wherein the space between the walls is evacuated so as to provide a very high vacuum between the walls to achieve the desired thermal insulation. When glass is used, it is necessary to protect the filler to the extent possible by providing a jacket encompassing it. The jacket is usually made of metal or plastic and the filler is supported therein by various kinds of protective supports very frequently functioning as shock absorbers so as to reduce the possibility of the filler breakage in the event the thermos bottle is dropped or hits something accidentally. Even though these steps are usually taken, a relatively low degree of protection is provided by this type of construction described, and it is relatively expensive.

Therefore, it is an object of this invention to provide a novel vacuum insulated container wherein a protective jacket is included which is relatively inexpensive to construct.

It is another object of this invention to provide a novel vacuum insulated container including a protective jacket which affords a relatively high degree of protection against breakage.

It is a still further object of this invention to provide a vacuum insulated container including a protective jacket which provides shock protection and because of the manner in which it is assembled on the filler considerably reduces unpleasant odor problems arising from leakage through seals such as are provided in the prior art.

BRIEF SUMMARY OF THE INVENTION

The foregoing and other objects of the invention are achieved in one embodiment thereof by providing a vacuum insulated container including a double-walled filler with space between the walls being evacuated to provide a vacuum insulating space therebetween and a protective jacket encompassing the filler and formed of a foamed self-skinning flexible plastic material or by using a rotationally or blow-molded skin and flexible foam inbetween the skin and the glass filler.

BRIEF DESCRIPTION OF THE DRAWING

The invention itself is set forth in the claims appended hereto and forming a part of this specification. An understanding of the structure of an embodiment thereof may be had by reference to the detailed description taken in conjunction with the drawing in which:

DETAILED DESCRIPTION

Figure 1:
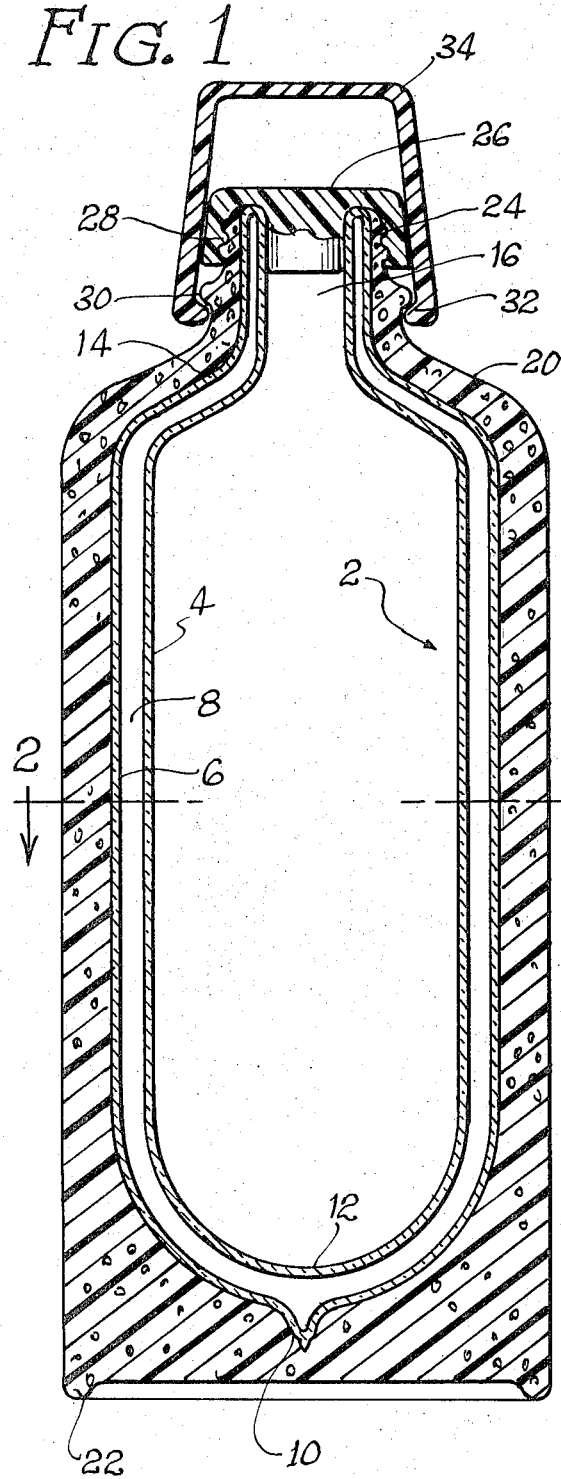
FIG. 1 is a side view in section of an embodiment of the invention.

A vacuum insulated container in accordance with the invention comprises a filler 2. The filler 2 includes an inner wall 4 and an outer wall 6 encompassing a space 8 therebetween. During manufacture of the filler the space 8 is evacuated by means well known in the art through an opening 10 which is then sealed so as to maintain the vacuum. As may be seen, the filler is provided with a closed bottom 12 and at its upper end may be provided with a neck 14 extending to a filling and pouring opening 16.

Encompassing the filler 2 is a jacket 18. The jacket tapers inwardly at its upper end 20 so as to conform to the shape of the filler. If desired, a supporting ledge or rim may be formed on the jacket as shown at 22. As may be seen in the drawing, the jacket 18 is of substantially greater thickness than the walls 4 and 6 of the filler 2.

Formed on the outer surface of the jacket at its upper end are first holding means 24 which may be formed as lugs or threads. A stopper 26 is provided and formed with matching holding means 28. The holding means 28 and 24 are engageable with each other to hold the stopper 26 in place and, as indicated, may take any number of forms such as threads or interengaging lugs so that the stopper may be inserted in the opening 16 with a wedging and sealing action and held there.

Also formed on the outer upper surface of the jacket 18 below the first holding means 24 are second holding means 30. The holding means 30 are engageable with matching holding means 32 provided on one end of a cup 34 which, as may be seen in FIg. 1, when inverted can be placed over the stopper 26 to be stored and function as a cover for the container.

In particular accordance with the invention, the jacket 18 is formed by molding in place a plastic material of such a nature that a good bond between the filler wall 6 and jacket will be achieved and in such a fashion as to provide for a continuous wall 6. A preferred material is a flexible urethane foam which, when activated, will foam so as to fill a mold to provide the desired shape. It is particularly preferred that the foam be of the self-skinning variety, that is, a foam which will produce a relatively hard or impervious outer surface or skin 34 completely around the outside of the bottle. Such a surface or skin may have a leather-like appearance and thus by physically attractive. Because of the flexible nature of the foam the container will have a soft pliant feel.

Figure 3:
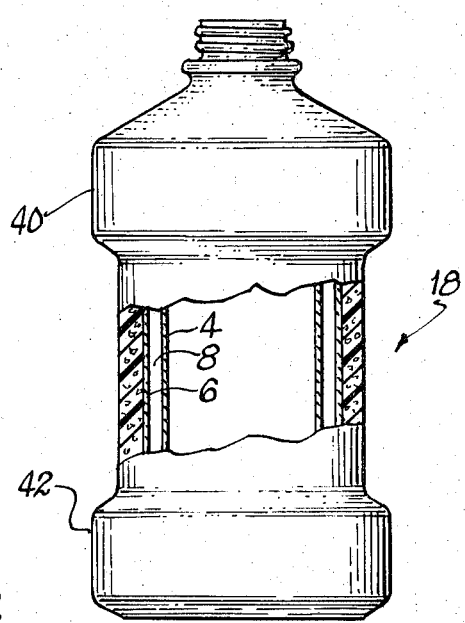
FIG. 3 is a partial section of an alternative embodiment of the invention.
Figure 2:
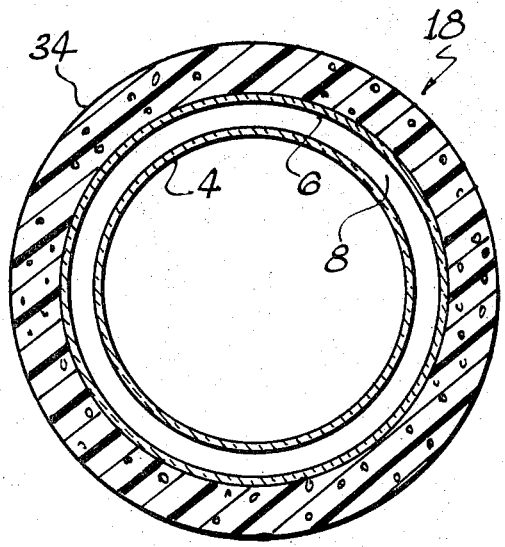
FIG. 2 is a view along the line 2—2 of FIG. 1.

FIG. 3 illustrates a second embodiment of the invention wherein impact restart bumpers 40 and 42 are provided by molding them at the top and bottom of the jacket 18.

While a self-skinning foam may be used as suggested, the jacket may be formed by blow or rotation-molding, a flexible vinyl skin and foaming in place a flexible foam material between the skin and the filler.

Various modifications may be made in the materials used and in the design of a vacuum container in accordance with the invention and it is desired by the claims to cover all such changes as fall within their scope.

What is claimed as new and desired to be secured by Letters Patent is:

1. A vacuum insulated container comprising: a double-walled filler with the space between the walls substantially evacuated so as to provide a vacuum insulating space therebetween and having a closed bottom at one end and an open throat leading to an opening at the other end for filling and pouring, a jacket of substantially greater thickness than the walls of the filler formed solely from a foamed plastic material having a relatively impervious outer skin encompassing and engaging the outer wall of the filler at its bottom and sides, said jacket is provided with first holding elements formed on the outer surface thereof adjacent said opening to hold a stopper in said opening, and second holding means formed on the outer surface of said jacket below said first holding means whereby a cup may be inverted and placed on the container to cover a stopper and be retained on said jacket.

2. A vacuum insulated bottle as set forth in claim 1 wherein said throat and said opening are of a smaller diameter than the remainder of said filler.

* * * * *